United States Patent
Zhang et al.

(10) Patent No.: US 9,803,552 B2
(45) Date of Patent: Oct. 31, 2017

(54) TURBINE ENGINE FUEL INJECTION SYSTEM AND METHODS OF ASSEMBLING THE SAME

(71) Applicant: General Electric Company, Schenectady, NY (US)

(72) Inventors: Yuxin Zhang, Niskayuna, NY (US); Obulesu Chatakonda, Bangalore (IN); Soumya Gudiyella, Cambridge, MA (US); Narendra Digamber Joshi, Guilderland, NY (US); Venkat Eswarlu Tangirala, Niskayuna, NY (US); Matthieu Marc Masquelet, Schenectady, NY (US); Shashank Yellapantula, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 70 days.

(21) Appl. No.: 14/927,578

(22) Filed: Oct. 30, 2015

(65) Prior Publication Data
US 2017/0122211 A1 May 4, 2017

(51) Int. Cl.
*F23R 3/28* (2006.01)
*F02C 7/22* (2006.01)
*F02C 7/04* (2006.01)

(52) U.S. Cl.
CPC ............... *F02C 7/222* (2013.01); *F02C 7/04* (2013.01); *F23R 3/286* (2013.01)

(58) Field of Classification Search
CPC .. F02C 7/04; F02C 7/232; F02C 7/222; F23R 3/286; F23R 3/28; F23R 3/12; F23R 3/04;
(Continued)

(56) References Cited

U.S. PATENT DOCUMENTS 4,928,479 A * 5/1990 Shekleton ............... F23R 3/28
60/746
5,403,181 A 4/1995 Tanaka et al.
(Continued)

FOREIGN PATENT DOCUMENTS

FR 2879672 A1 6/2006
FR 2879682 A1 6/2006
(Continued)

OTHER PUBLICATIONS

Butcher, et al., Development of a real-size optical injector nozzle for studies of cavitation, spray formation and flash-boiling at conditions relevant to direct-injection spark-ignition engines, International Journal of Engine Research, dated 2013, pp. 557-577.
(Continued)

*Primary Examiner* — Arun Goyal
(74) *Attorney, Agent, or Firm* — Nitin N. Joshi

(57) ABSTRACT

A fuel injection system for use in a combustor of a turbine assembly includes a substantially annular fuel injection housing at least partially defining an annular cavity. The fuel injection system also includes a fuel manifold and an air manifold. The fuel manifold includes a plurality of fuel injection ports extending through the fuel injection housing. The air manifold includes a first plurality of air injection ports and a second plurality of air injection ports that each extends through the fuel injection housing.

17 Claims, 5 Drawing Sheets

(58) Field of Classification Search
CPC ............. F05D 2260/96; F05D 2270/08; F05D 2270/14; F23K 5/14; F16K 11/07; F16K 31/1268
See application file for complete search history.

(56) References Cited

U.S. PATENT DOCUMENTS

| | | | |
|---|---|---|---|
| 5,435,884 | A | 7/1995 | Simmons et al. |
| 5,761,906 | A | 6/1998 | Norster |
| 6,070,411 | A * | 6/2000 | Iwai .................. F23D 17/00 60/737 |
| 6,141,967 | A * | 11/2000 | Angel .................. F23R 3/286 239/405 |
| 6,381,964 | B1 | 5/2002 | Pritchard, Jr. et al. |
| 6,539,721 | B2 | 4/2003 | Oikawa et al. |
| 7,464,553 | B2 | 12/2008 | Hsieh et al. |
| 7,581,396 | B2 | 9/2009 | Hsieh et al. |
| 7,758,334 | B2 | 7/2010 | Shimo et al. |
| 8,146,837 | B2 | 4/2012 | Thomson et al. |
| 8,171,735 | B2 | 5/2012 | Mancini et al. |
| 8,549,859 | B2 | 10/2013 | Fox et al. |
| 8,555,645 | B2 | 10/2013 | Duncan et al. |
| 8,616,003 | B2 | 12/2013 | Hollon et al. |
| 8,718,901 | B2 | 5/2014 | Brewster et al. |
| 2001/0004515 | A1* | 6/2001 | Scarinci .................. F23C 6/047 431/352 |
| 2004/0025508 | A1* | 2/2004 | Calvez .................. F23R 3/14 60/746 |
| 2007/0151250 | A1* | 7/2007 | Haynes .................. F23R 3/54 60/772 |
| 2009/0111063 | A1 | 4/2009 | Boardman et al. |
| 2010/0300102 | A1 | 12/2010 | Bathina et al. |
| 2012/0167544 | A1 | 7/2012 | Toronto et al. |
| 2013/0189632 | A1 | 7/2013 | Menon et al. |
| 2016/0363319 | A1* | 12/2016 | Monahan ................ F23R 3/286 |

FOREIGN PATENT DOCUMENTS

| | | |
|---|---|---|
| RU | 2439435 C1 | 1/2012 |
| WO | 02090764 A1 | 11/2002 |

OTHER PUBLICATIONS

Gopalakrishnan, "Characterization of the Reacting Flowfield in a Liquid-Fueled Stagnation Point Reverse Flow combustor", 45th AIAA Aerospace Sciences Meeting and Exhibit Reno, American Institute of Aeronautics and Astronautics, pp. 01-09, Nevada, Jan. 8-11, 2007.

US Non-Final Office Action issued in connection with related U.S. Appl. No. 14/461,069 dated Feb. 24, 2017.

Gopalakrishnan et al., "Product Recirculation and Mixing Studies in a Stagnation Point Reverse Flow Combustor," 45th AIAA Aerospace Sciences Meeting and Exhibit Reno, American Institute of Aeronautics and Astronautics, pp. 01-13, Nevada, Jan. 8-11, 2007.

GE Related Case Form.

* cited by examiner

TURBINE ENGINE FUEL INJECTION SYSTEM AND METHODS OF ASSEMBLING THE SAME

BACKGROUND

The field of the invention relates generally to turbine engines, and more particularly, to removing heat from combustor components within turbine engines.

At least some known turbine engines include a forward fan, a core engine, and a power turbine. The core engine includes at least one compressor that provides pressurized air to a combustor wherein the air is mixed with fuel and ignited for use in generating hot combustion gases. Generated combustion gases flow downstream to one or more turbines that extract energy from the gas to power the compressor and provide useful work, such as powering an aircraft. A turbine section may include a stationary turbine nozzle positioned at the outlet of the combustor for channeling combustion gases into a turbine rotor downstream thereof. At least some known turbine rotors include a plurality of circumferentially-spaced turbine blades that extend radially outward from a rotor disk that rotates about a centerline axis of the engine.

In at least some known combustors, fuel and air are pre-mixed in the fuel nozzle to produce a lean combustion flame that reduces NOx emissions. In some known systems, NOx emissions are further reduced with the use of an airflow system that channels air through swirl vane assemblies and around nested fuel nozzles to reduce internal temperatures. In such systems, a fuel nozzle system channels the air/fuel mixture to the ignition zone for combustion. However, the use of fuel nozzle assemblies may undesirably increase the potential for auto-ignition or flashback of residual fuel that lingers in areas around the system. More specifically, without adequate cooling of the system structure, the potential for auto-ignition or flashback is increased. As such the operational lifetime of the fuel nozzle system may be shortened.

BRIEF DESCRIPTION

In one aspect, a fuel injection system for use in a combustor of a turbine assembly is provided. The fuel injection system includes a substantially annular fuel injection housing at least partially defining an annular cavity. The fuel injection system also includes a fuel manifold and an air manifold. The fuel manifold includes a plurality of fuel injection ports extending through the fuel injection housing. The air manifold includes a first plurality of air injection ports and a second plurality of air injection ports that each extends through the fuel injection housing.

In another aspect, a mixer assembly for use in a combustor of a turbine engine is provided. The mixer assembly includes a mixer having a main housing and a fuel injection system positioned within the main housing. The fuel injection system includes a fuel injection housing positioned radially inward of the main housing such that an annular cavity is defined therebetween, wherein the fuel injection system is in fluid communication with the annular cavity. The fuel injection system also includes a fuel manifold including a plurality of fuel injection ports extending through the fuel injection housing. The fuel injection system also includes an air manifold including a first plurality of air injection ports and a second plurality of air injection ports, each extending through the fuel injection housing.

In another aspect, a method of assembling a fuel injection system for use in a combustor of a turbine assembly is provided. The method includes positioning a fuel manifold at least partially within a fuel injection housing such that the fuel injection housing at least partially defines an annular cavity. The method also includes forming a plurality of fuel injection ports in the fuel manifold such that the fuel injection ports extend through the fuel injection housing. Each fuel injection port of the plurality of fuel injection ports is configured to introduce a fuel stream into the annular cavity. The method also includes positioning an air manifold at least partially within the fuel injection housing and forming a first plurality of air injection ports in the air manifold such that the first plurality of air injection ports extend through the fuel injection housing downstream of the plurality of fuel injection ports. The method also includes forming a second plurality of air injection ports in the air manifold such that the second plurality of air injection ports extend through the fuel injection housing downstream of the first plurality of air injection ports. Each air injection port of the first plurality of fuel injection ports and second plurality of fuel injection ports is configured to introduce an air cushion into the annular cavity to facilitate film cooling of the fuel injection housing.

DRAWINGS

These and other features, aspects, and advantages of the present disclosure will become better understood when the following detailed description is read with reference to the accompanying drawings in which like characters represent like parts throughout the drawings, wherein.

Figure 1:
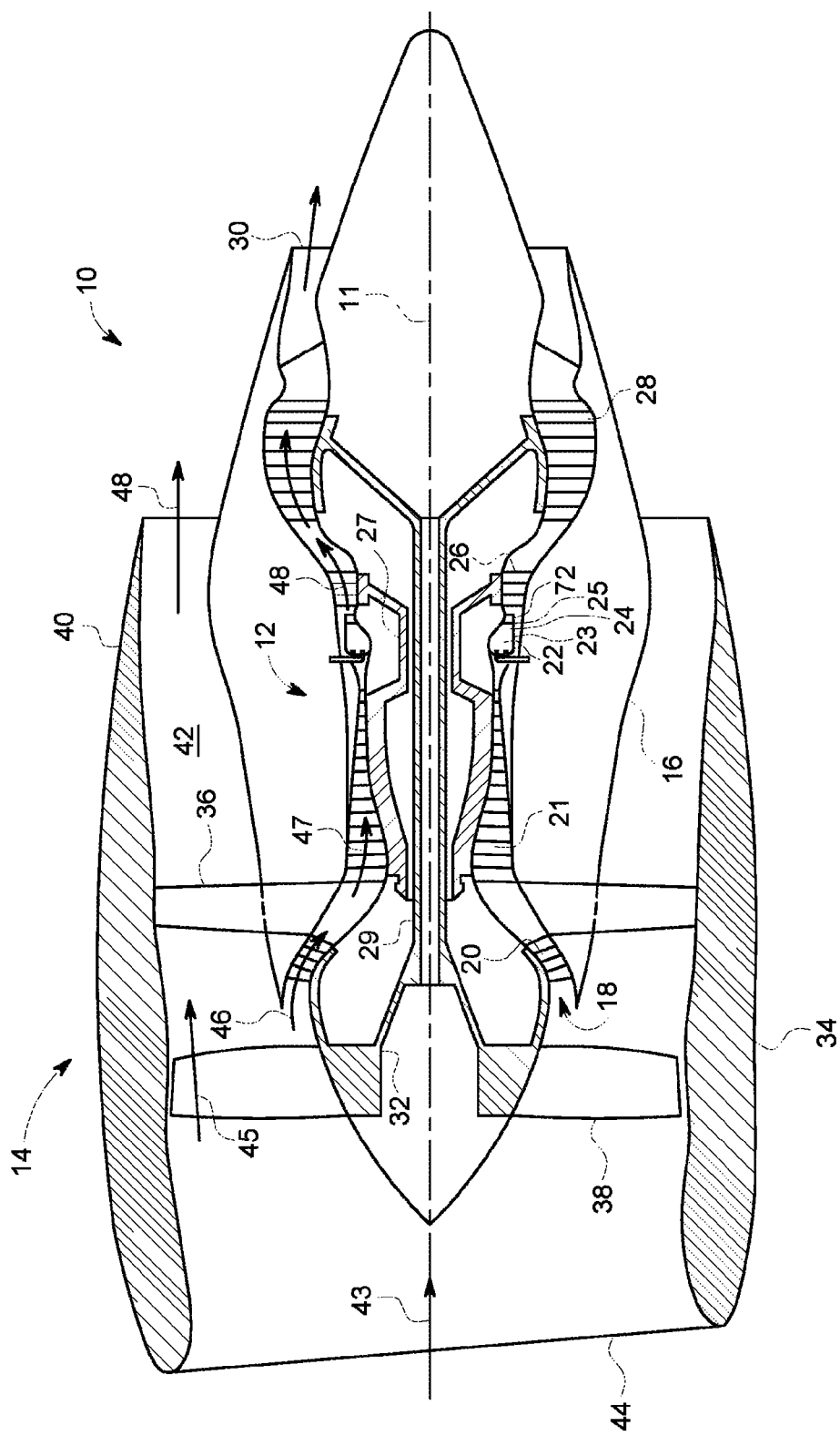
FIG. 1 is a cross-sectional view of an exemplary turbine engine assembly.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged; such ranges are identified and include all the sub-ranges contained therein unless context or language indicates otherwise.

As used herein, the term "first end" is used throughout this application to refer to directions and orientations located upstream in an overall axial flow direction of fluids with respect to a center longitudinal axis of a combustion chamber. The terms "axial" and "axially" are used throughout this application to refer to directions and orientations extending substantially parallel to a center longitudinal axis of a combustion chamber. Terms "radial" and "radially" are used throughout this application to refer to directions and orientations extending substantially perpendicular to a center longitudinal axis of the combustion chamber. Terms "upstream" and "downstream" are used throughout this application to refer to directions and orientations located in an overall axial flow direction with respect to the center longitudinal axis of the combustion chamber.

The fuel injection systems described herein facilitate efficient methods of turbine assembly operation. Specifically, in contrast to many known fuel injection systems, the fuel injection system described herein includes two separate pluralities of air injection ports for forming air cushions that provide a barrier between a fuel stream and the relatively high temperature fuel injection housing. The first plurality of air injection ports includes a plurality of sets of ports, wherein each set is associated with a corresponding fuel injection port.

Accordingly, the fuel injection systems described herein provide various technological advantages and/or improvements over existing mixer assemblies and fuel injection systems. The disclosed fuel injection system enhances the mixing of the fuel flowing from the fuel injector with air supplied via a swirler to the combustion chamber and thus reduces production of undesirable emissions such as oxides of nitrogen or NOx. In addition, the air cushions formed between the fuel stream and the fuel injection housing surface provide for the reduction in the risk of autoignition that may lead to improved durability of the hardware, and thereby a reduction in the need for maintenance or replacement. Furthermore, the fuel injection system described herein channels only approximately 0.5% and approximately 3% of the total amount of cooled air channeled from the compressor to the combustor. As a result of the above, various embodiments of the present disclosure facilitate extended combustor operating conditions, extend the life and/or maintenance intervals for various combustor components, maintain adequate design margins of flame holding, and/or reduce undesirable emissions. In addition, improved fuel-air mixing is also expected to yield better efficiency at a cruise condition.

FIG. 1 shows a cross-sectional view of an exemplary turbine engine assembly 10 having a longitudinal or centerline axis 11 therethrough. Although FIG. 1 shows a turbine engine assembly for use in an aircraft, assembly 10 is any turbine engine that facilitates operation as described herein, such as, but not limited to, a ground-based gas turbine engine assembly. Assembly 10 includes a core turbine engine 12 and a fan section 14 positioned upstream of core turbine engine 12. Core engine 12 includes a generally tubular outer casing 16 that defines an annular inlet 18. Outer casing 16 further encloses and supports a booster compressor 20 for raising the pressure of air entering core engine 12. A high pressure, multi-stage, axial-flow high pressure compressor 21 receives pressurized air from booster 20 and further increases the pressure of the air. The pressurized air flows to a combustor 22, generally defined by a combustion liner 23, and including a mixer assembly 24, where fuel is injected into the pressurized air stream, via one or more fuel nozzles 25 to raise the temperature and energy level of the pressurized air. The high energy combustion products flow from combustor 22 to a first (high pressure) turbine 26 for driving high pressure compressor 21 through a first (high pressure) drive shaft 27, and then to a second (low pressure) turbine 28 for driving booster compressor 20 and fan section 14 through a second (low pressure) drive shaft 29 that is coaxial with first drive shaft 27. After driving each of turbines 26 and 28, the combustion products leave core engine 12 through an exhaust nozzle 30 to provide propulsive jet thrust.

Fan section 14 includes a rotatable, axial-flow fan rotor 32 that is surrounded by an annular fan casing 34. It will be appreciated that fan casing 34 is supported from core engine 12 by a plurality of substantially radially-extending, circumferentially-spaced outlet guide vanes 36. In this way, fan casing 34 encloses the fan rotor 32 and a plurality of fan rotor blades 38. A downstream section 40 of fan casing 34 extends over an outer portion of core engine 12 to define a secondary, or bypass, airflow conduit 42 that provides propulsive jet thrust.

In operation, an initial air flow 43 enters turbine engine assembly 10 through an inlet 44 to fan casing 34. Air flow 43 passes through fan blades 38 and splits into a first air flow (represented by arrow 45) and a second air flow (represented by arrow 46) which enters booster compressor 20. The pressure of the second air flow 46 is increased and enters high pressure compressor 21, as represented by arrow 47. After mixing with fuel and being combusted in combustor 22 combustion products 48 exit combustor 22 and flow through the first turbine 26. Combustion products 48 then flow through the second turbine 28 and exit the exhaust nozzle 30 to provide thrust for the turbine engine assembly 10.

Fuel nozzles 25 in the mixer assembly 24 intake fuel from a fuel supply (e.g., liquid and/or gas fuel), mix the fuel with air, and distribute the air-fuel mixture into combustor 22 in a suitable ratio for optimal combustion, emissions, fuel consumption, and power output. Turbine engine assembly 10 includes mixer assembly 24 including the one or more fuel nozzles 25, having a fuel injection system, described in further detail below.

Figure 2:
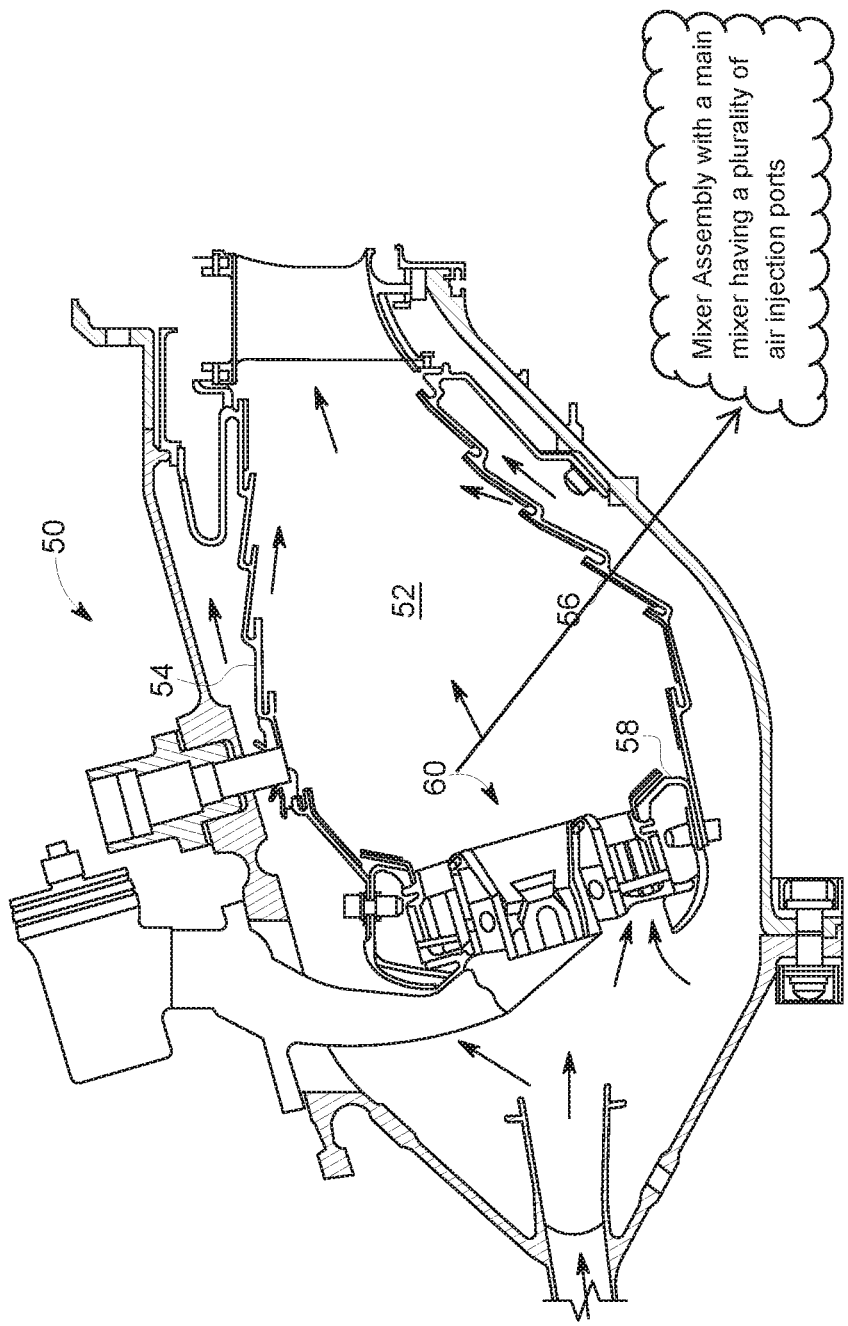
FIG. 2 is a cross-sectional view of a portion of an exemplary combustor that may be used with the turbine engine assembly shown in FIG. 1.

FIG. 2 is a cross-sectional view of a portion of an exemplary combustor 50 that may be used with turbine engine assembly 10. Combustor 50 defines a combustion chamber 52 in which combustor air is mixed with fuel and combusted. Combustor 50 includes an outer liner 54 and an inner liner 56. Outer liner 54 defines an outer boundary of the combustion chamber 52, and inner liner 56 defines an inner boundary of combustion chamber 52. An annular dome 58 is mounted upstream from outer liner 54 and inner liner 56 defines an upstream end of combustion chamber 52. One or more mixer assemblies 60 are positioned on dome 58. In the exemplary embodiment, each mixer assembly 60 includes a fuel injection system, described in further detail below for delivery of a mixture of fuel and air to combustion chamber 52. Other features of the combustion chamber 52 are conventional and will not be discussed in further detail.

Figure 3:
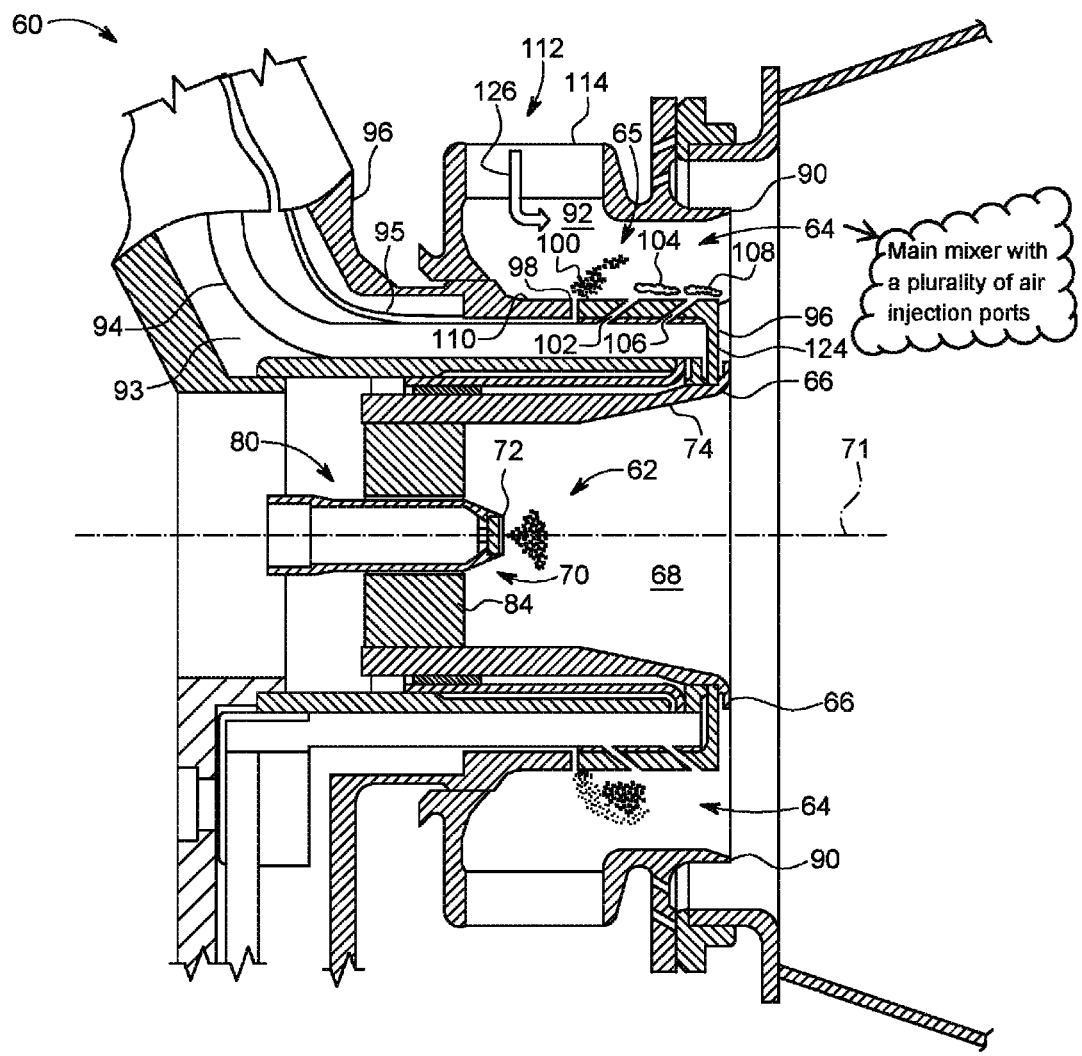
FIG. 3 is a cross-sectional view of a mixer assembly including an exemplary fuel injection system that may be used with the combustor shown in FIG. 2.

FIG. 3 is a cross-sectional view of a mixer assembly 60 including an exemplary fuel injection system 65 that may be used with combustor 50 (shown in FIG. 2). Each mixer assembly 60 includes a pilot mixer 62 and a main mixer 64. In the exemplary embodiment, main mixer 64 includes an air-shielded fuel injection system 65 surrounding pilot mixer 62. Pilot mixer 62 includes an annular pilot housing 66 having a hollow interior 68. A pilot fuel nozzle 70 is mounted in annular pilot housing 66 along a centerline 71 of mixer assembly 60. Pilot fuel nozzle 70 includes a fuel injector 72 adapted for dispensing droplets of fuel into hollow interior 68 of the pilot housing 66.

In the exemplary embodiment, pilot mixer 62 also includes a concentrically mounted axial swirler 80. Swirler 80 includes a plurality of vanes 84 and is positioned upstream from pilot fuel nozzle 70. Each of vanes 84 is skewed relative to centerline 71 of mixer 60 for swirling air traveling through axial swirler 80 so the air mixes with the droplets of fuel dispensed by pilot fuel nozzle 70 to form a fuel-air mixture selected for combustion during ignition and low power settings of the engine. Although pilot mixer 62 of the disclosed embodiment has a single axial swirler 80, alternative embodiments of pilot mixer 62 include more swirlers 80 For those embodiments when more than one swirler 80 is included in pilot mixer 62, swirlers 80 are configured to have differing numbers of vanes 84 as well as configured to swirl air in the same direction or in opposite directions. Further, hollow interior 68 is sized and axial swirler 80 airflow and swirl angle are selected to facilitate good ignition characteristics, lean stability, and low carbon monoxide (CO) and hydrocarbon (HC) emissions at low power conditions.

Pilot housing 66 includes a generally diverging inner surface 74 adapted to provide controlled diffusion for mixing the pilot air with the main mixer airflow. The diffusion also reduces the axial velocities of air passing through pilot mixer 62 and facilitates recirculation of hot gasses to stabilize the pilot flame.

Main mixer 64 includes a main housing 90 surrounding pilot housing 66 and defining an annular cavity 92. In the exemplary embodiment, cavity 92 is coupled in flow communication fuel injection system 65.

In the exemplary embodiment, fuel injection system 65 includes an air manifold 94 and a fuel manifold 95 mounted within a cavity 93 defined by a fuel injection housing 96. Fuel injection housing 96 is positioned radially between pilot housing 66 and main housing 90. Fuel manifold 95 includes a plurality of circumferentially-spaced fuel injection ports 98 for introducing a fuel stream 100, made up of droplets of fuel, into cavity 92 of main mixer 64. In the exemplary embodiment, fuel manifold 95 includes a single circumferential row consisting of ten evenly spaced ports 98. Alternatively, fuel manifold 95 has any number of fuel injection ports 98 without departing from the scope of the present disclosure. Although ports 98 are arranged in a single circumferential row in the embodiment shown in FIG. 3 they are arranged in other configurations.

Air manifold 94 includes a first plurality of air injection ports 102 for introducing a first air cushion 104 and a second plurality of air injection ports 106 for introducing a second air cushion 108 into cavity 92 of main mixer 64. As used herein, the term "cushion" is used to indicate a barrier of cooling air that spaces fuel stream 100 from the relatively high temperature axial surface 110 of injection housing 96. In the exemplary embodiment, air injection ports 102 and 106 extend through fuel injection housing 96 and are positioned downstream from fuel injection ports 98 to form cushions 104 and 108 within cavity 92 between fuel stream 100 and an axial surface 110 of fuel injection housing 96. As such, cushions 104 and 108 spread across surface 110 and facilitate film cooling of surface 110 while also reducing fuel residence time within cavity 92 and the risk of fuel stream 100 autoignition. In the exemplary embodiment, fuel injection system 65 channels through first and second pluralities of air injection ports 102 and 106 only 0.5% to 3% of the total amount of cooled air channeled from the compressor to the combustor, which leaves more air available for combustion than existing mixer assemblies and fuel injection systems, thus increasing the efficiency of turbine engine assembly 10.

Main mixer 64 also includes a swirler 112 positioned upstream from the plurality of fuel injection ports 98 and the pluralities of air injection ports 102 and 106. Although alternative embodiments of swirler 112 have other configurations, in one embodiment, swirler 112 is a radial swirler having a plurality of radially skewed vanes 114 for swirling air traveling through swirler 112 to mix air passing through swirler 112 and injected by air injection ports 102 and 106 and the droplets of fuel dispensed by fuel injection ports 98 in fuel injection housing 96 to form a fuel-air mixture selected for combustion during high power settings of the engine. Main mixer 64 is primarily designed to facilitate low NOx production under high power conditions by operating with a lean air-fuel mixture and by mixing the fuel and air via the air cushions 104 and 108 and fuel stream 100. Swirler 112 mixes the incoming air through radial vanes 114 and establishes the basic flow field of combustor 50 (shown in FIG. 2). During operation, fuel droplets are injected radially outward into the swirling air stream downstream from swirler 112 as fuel stream 100. Swirler 112, in combination with air cushions 104 and 108 and fuel stream 100, facilitate thorough mixing within main mixer cavity 92 upstream from its exit. This swirling mixture enters the combustor chamber 52 (shown in FIG. 2) where it is substantially combusted.

Figure 4:
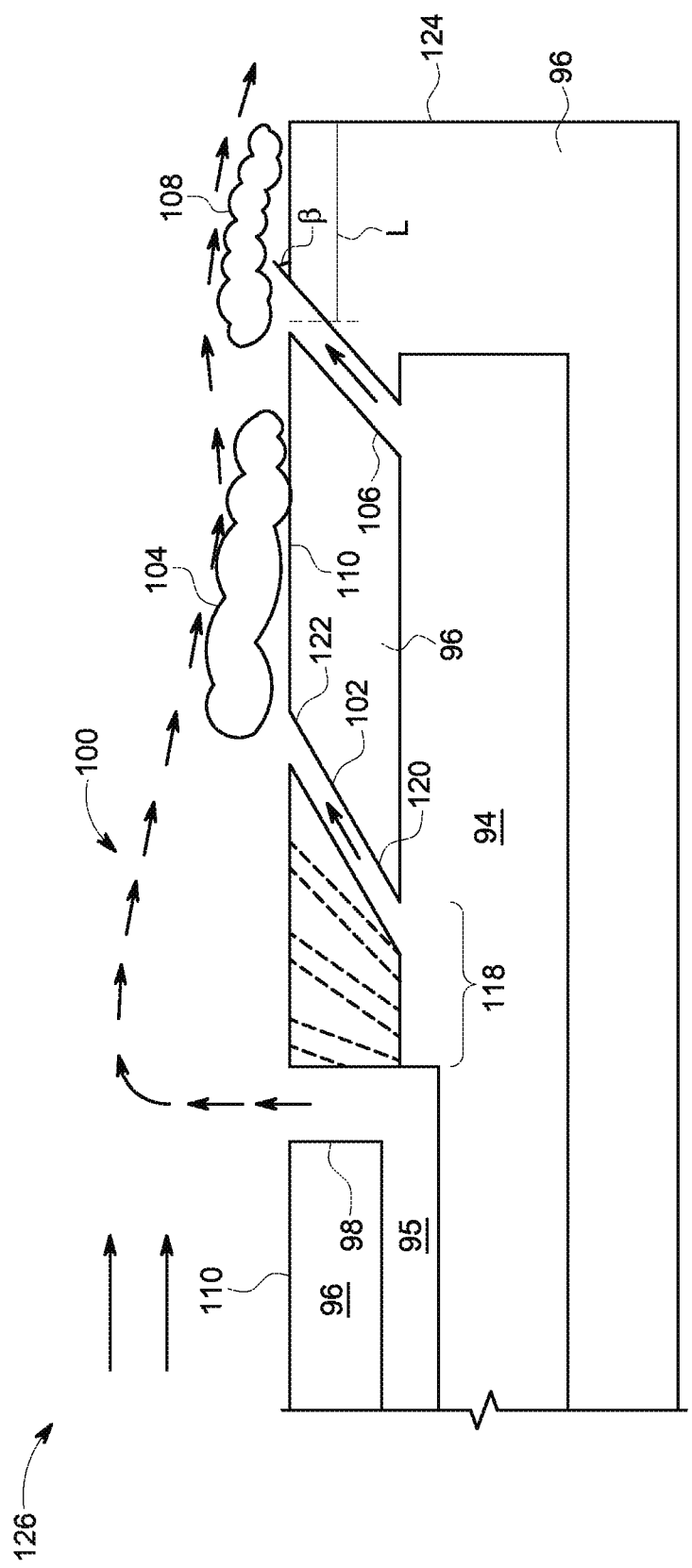
FIG. 4 is an enlarged cross-sectional view of the fuel injection system shown in FIG. 3 showing a fuel injection flow pattern induced by the fuel injection system.
Figure 5:
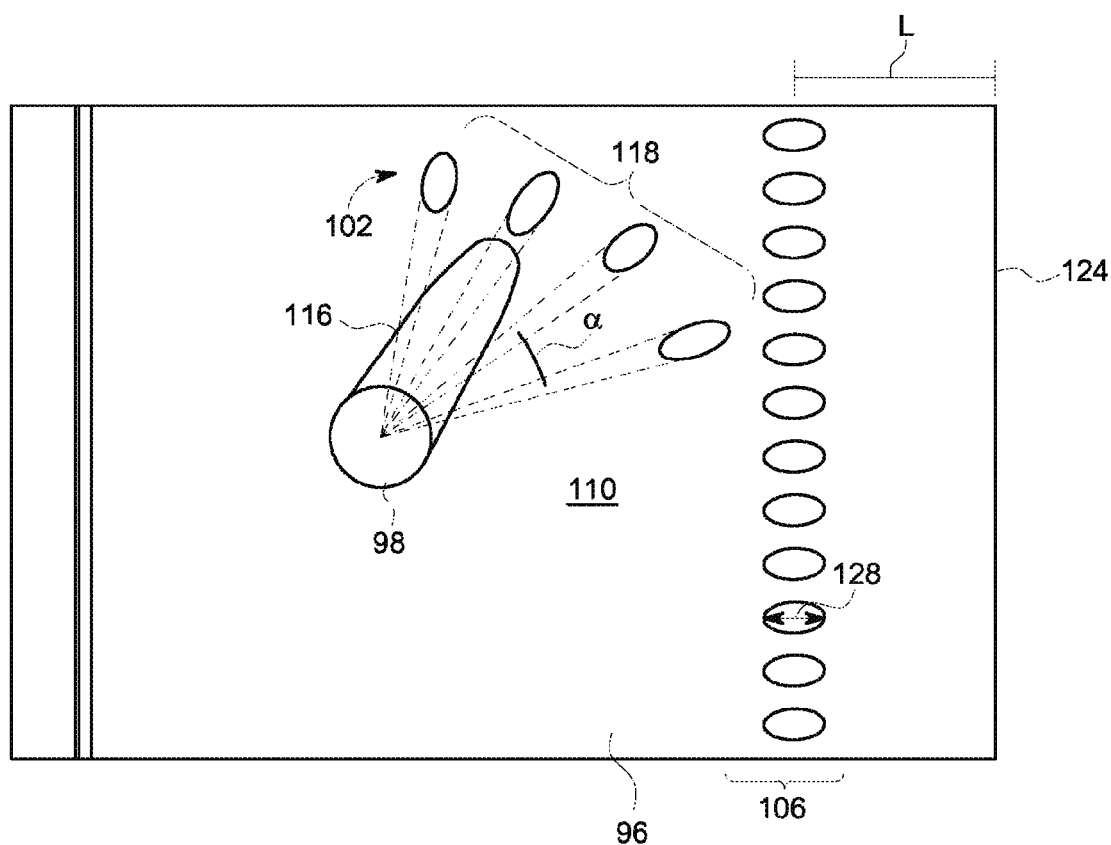
FIG. 5 is a top view of the fuel injection system shown in FIG. 4.

FIG. 4 is an enlarged cross-sectional view of fuel injection system 65 showing a fuel injection flow pattern induced by fuel injection system 65. FIG. 5 is a top view of a portion of fuel injection system 65. Fuel injection system 65 includes a fuel collection indentation 116 formed in surface 110 proximate fuel injection port 98. Indentation 116 forms an ovular-shaped depression in surface 110 such that, when fuel flow is terminated, the fuel that gets channeled through port 98, but not further downstream, is collected in indentation 116 and is drained back into port 98 so that it doesn't autoignite on surface 110 or dry to result in coking.

In the exemplary embodiment, first plurality of air injection ports 102 includes a plurality of sets 118 of air injection ports such that each set 118 is associated with a corresponding fuel injection port 98. Each injection port in set 118 acts as a lifting jet to push fuel stream 100 away from surface 110 into cavity 92 to prevent autoignition and minimize residence time of fuel stream 100 near surface 110. In the exemplary implementation, each set 118 of first air injection ports 102 includes a plurality of equally-spaced ports 102 that form an arcual shape proximate fuel collection indentation 116. More specifically, each set 118 includes a range of approximately three to seven ports 102 that are spaced apart by a predetermined angle α. In the exemplary embodiment, values of α are in a range of approximately 15 degrees and approximately 30 degrees with respect to a center point of fuel port 98.

As shown in FIG. 5, each set 118 of ports 102 is positioned both downstream from and circumferentially offset from the corresponding fuel injection port 98 such that fuel collection indentation 116 extends from fuel injection port 98 to set 118 of air injection ports 102. In the exemplary implementation, each first air injection port 102 extends obliquely through housing 96 from cavity 93 to cavity 92. More specifically, a first end 120 of each first air injection port 102 is formed upstream of a first air injection port second end 122. As such, the air channeled through each first air injection port 102 includes an axial and a radial component such that first air cushion 104 is formed on surface 110 at a location most likely to contact fuel stream 100.

In the exemplary embodiment, each air injection port 102 includes an elliptical cross-sectional shape. Alternatively, each air injection port 102 includes a circular or tear-drop cross-sectional shape. Also, alternatively, each air injection port 102 includes any cross-sectional shape that facilitates operation of fuel injection system 65 as described herein. Additionally, each first air injection port 102 includes a diameter within a range of approximately 0.001 inches (0.0254 millimeters) and approximately 0.005 inches (0.127 millimeters). More specifically, each air injection port 102 includes a diameter within a range of approximately 0.002 inches (0.051 millimeters) and approximately 0.003 inches (0.076 millimeters). Alternatively, each air injection port 102 includes any diameter that facilitates operation of fuel injection system 65 as described herein.

In the exemplary embodiment, second plurality of air injection ports 106 includes at least one row of ports 106 formed through fuel injection housing 96, where air injection ports 106 are circumferentially-spaced and equally-spaced with respect to turbine centerline 71. More specifically, second plurality of air injection ports 106 is positioned downstream from first air injection ports 102 such that second air injection ports 106 are spaced a distance L from a radially oriented surface 124 of injection housing 96. In the exemplary embodiment, distance L is within a range of approximately 0.079 inches (2.0 millimeters) and approximately 0.394 inches (10.0 millimeters) from surface 124. More specifically, distance L is within a range of approximately 0.138 inches (3.50 millimeters) and approximately 0.256 inches (6.50 millimeters) from surface 124. Alternatively, second air injection ports 106 are spaced any distance from surface 124 that facilitates operation of fuel injection system 65 as described herein. In embodiments having more than a single row of second injection ports 106, distance L is the distance from surface 124 to a center point of the most downstream row of ports 106.

In the exemplary embodiment, second plurality of air injection ports 106 facilitate film cooling surface 110 and reducing the risk of fuel reattachment to surface 110 downstream of first air injection ports 102, which mitigates autoignition events. As best shown in FIG. 4, each second injection port 106 is formed through injection housing 96 and is oriented at an angle β with respect to surface 110. In the exemplary embodiment, a value of β is within a range of approximately 20 degrees and approximately 40 degrees with respect to surface 110. More specifically, angle β is a value within a range of approximately 27 degrees and approximately 33 degrees. Even more specifically, angle β is approximately 30 degrees.

In the exemplary embodiment, each air injection port 106 includes an elliptical cross-sectional shape. Alternatively, each air injection port 106 includes a circular or tear-drop cross-sectional shape. Generally, each air injection port 106 includes any cross-sectional shape that facilitates operation of fuel injection system 65 as described herein. In the exemplary embodiment, each air injection port 106 includes a major axis 128 of the elliptical cross-section. In one embodiment, axis 128 is substantially parallel with turbine centerline axis 11 (shown in FIG. 1). In another embodiment, axis 128, and therefore ports 106, is oriented to align with and be parallel to an angle of vane 114 of swirler 112. More specifically, second air injection ports 106 are oriented such that the air being channeled therefrom is substantially aligned with an airflow 126 being channeled through cavity 92 by swirler 112.

Additionally, each air injection port 106 includes a diameter within a range of approximately 0.001 inches (0.0254 millimeters) and approximately 0.005 inches (0.127 millimeters). More specifically, each air injection port 106 includes a diameter within a range of approximately 0.002 inches (0.051 millimeters) and approximately 0.003 inches (0.076 millimeters). Alternatively, each air injection port 102 includes any diameter that facilitates operation of fuel injection system 65 as described herein.

Exemplary embodiments of a fuel injection system for use in a combustion chamber of a turbine assembly are described in detail above. The fuel injection system includes a substantially annular fuel injection housing, a fuel manifold, and an air manifold. The fuel manifold includes a plurality of fuel injection ports extending through the fuel injection housing. Each fuel injection port is configured to introduce a fuel stream into an annular cavity. The air manifold includes a first plurality of air injection ports and a second plurality of air injection ports that each extends through the fuel injection housing. Each air injection port of the first and second pluralities is configured to introduce an air cushion into the annular cavity to facilitate film cooling of the fuel injection housing.

An exemplary technical effect of the methods, systems, and apparatus described herein includes at least one of: (a) enhancing the mixing of the fuel flowing from the fuel injector with air supplied via a swirler to the combustion chamber; (b) reducing production of undesirable emissions such as oxides of nitrogen or NOx; (c) reducing the risk of autoignition that leads to improved durability of the hardware, and thereby reducing the need for maintenance or replacement; (d) increasing efficiency of the turbine engine by reducing the amount of air required to cool fuel injection components. As a result of the above, various embodiments of the present disclosure facilitates extended combustor operating conditions, extend the life and/or maintenance intervals for various combustor components, maintain adequate design margins of flame holding, and/or reduce undesirable emissions. In addition, improved fuel-air mixing is also expected to yield better efficiency at a cruise condition.

Exemplary embodiments of methods, systems, and apparatus for a fuel injection system are not limited to the specific embodiments described herein, but rather, components of systems and steps of the methods may be utilized independently and separately from other components and steps described herein. For example, the methods may also be used in combination with other fuel injection assemblies, and are not limited to practice with only the fuel injection system and methods as described herein. Rather, the exemplary embodiment can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel injection system for use with a combustor of a turbine assembly, said fuel injection system comprising:
   a pilot mixer:
   a main mixer comprising:
   a substantially annular fuel injection housing having an inner wall and an outer wall;
   at least partially defining an annular cavity radially outward and surrounding said outer wall;
   a fuel manifold extending through said substantially annular fuel injection housing in fluid communication with a plurality of fuel injection ports; and
   an air manifold defining a first plurality of air injection ports and a second plurality of air injection ports, said first plurality of air injection ports and said second plurality of air injection ports extend through said substantially annular fuel injection housing from said inner wall to said outer wall,
   wherein each one of said first plurality of air injection ports is in fluid communication with a set of plurality of ports,
   wherein each of said set of plurality of ports is associated with a corresponding fuel injection port of said plurality of fuel injection ports,
   wherein each port of said set of plurality of ports is equally spaced around said outer wall forming a substantially arcual shape having an arc center at a center point of said corresponding fuel injection port, and
   wherein the fuel injection system delivers a mixture of fuel and air to a combustion chamber of the combustor.

2. The fuel injection system in accordance with claim 1, wherein each fuel injection port of said plurality of fuel injection ports is configured to introduce a fuel stream into said annular cavity, and wherein each air injection-port of said first plurality of air injection ports and said second plurality of air injection ports is configured to introduce an air cushion into said annular cavity of the main mixer, said plurality of fuel injection ports positioned upstream from said first plurality of air injection ports and said second plurality of air injection ports such that said air cushion push said fuel stream away from said substantially annular fuel injection housing into said annular cavity of the main mixer.

3. The fuel injection system in accordance with claim 1, wherein each of said set of plurality of ports is positioned downstream from and circumferentially offset from said corresponding fuel injection port.

4. The fuel injection system in accordance with claim 1, wherein said second plurality of air injection ports comprises at least one row of equally circumferentially-spaced air injection ports about said outer wall of said substantially annular fuel injection housing.

5. The fuel injection system in accordance with claim 1, wherein each air injection port of said second plurality of air injection ports extends through said outer wall of said substantially annular fuel injection housing at an angle of approximately 20 degrees with respect to a longitudinal axis of the turbine assembly.

6. The fuel injection system in accordance with claim 1, wherein each air injection port of said second plurality of air injection ports has an elliptical cross-sectional shape.

7. The fuel injection system in accordance with claim 1, wherein the fuel injection system is positioned on an annular dome mounted upstream from the combustion chamber.

8. The fuel injection system in accordance with claim 1, wherein said second plurality of air injection ports comprises at least two rows of equally circumferentially-spaced air injection ports about said outer wall of said substantially annular fuel injection housing.

9. A mixer assembly for use with a combustor of a turbine engine, the assembly comprising:
   a mixer comprising a main housing; and
   a fuel injection system positioned within said main housing, said fuel injection system comprising:
   a fuel injection housing radially inward of said main housing such that an annular cavity is defined therebetween said fuel injection housing having an inner wall and an outer wall, said fuel injection system in fluid communication with said annular cavity;
   a fuel manfold extending through said fuel injection housing in fluid communication with a plurality of fuel injection ports; and
   an air manifold defining a first plurality of air injection ports and a second plurality of air injection ports extending through said fuel injection housing from said inner wall to said outer wall,
   wherein each one of said first plurality of air injection ports is in fluid communication with a set of plurality of ports,
   wherein each of said set of plurality of ports is associated with a corresponding fuel injection port of said plurality of fuel injection ports,
   wherein each port of said set of plurality of ports is equally spaced around said outer wall forming a substantiality arcual shape having an arc center at a center point of said corresponding fuel injection port, and
   wherein the fuel injection system is positioned on an annular dome mounted upstream from a combustion chamber of the combustor.

10. The mixer assembly in accordance with claim 9, further comprising a swirler positioned upstream from said fuel injection system, said swirler comprising a plurality of swirler vanes configured to swirl an airflow traveling through said swirler.

11. The mixer assembly in accordance with claim 10, wherein each air injection port of said second plurality of air injection ports includes an elliptical cross-sectional shape.

12. The mixer assembly in accordance with claim 9, wherein each fuel injection port of said plurality of fuel injection ports is configured to introduce a fuel stream into said annular cavity, and wherein each air injection port of said first pluraiity of air injection ports and said second plurality of air injection ports is configured to introduce an air cushion into said annular cavity, said plurality of fuel inection ports positioned upstream from said first plurality of air inection ports and said second plurality of air injection ports such that said air cushion push said fuel stream and away from said fuel injection housing into said annular cavity.

13. The mixer assembly in accordance with claim 9, wherein each of said set of plurality of ports is positioned downstream from and circumferentially offset from said corresponding fuel injection port.

14. The mixer assembly in accordance with claim 9, wherein said second plurality of air injection ports comprises at least one row of equally circumferentially-spaced air injection ports about said outer wall of said fuel injection housing.

15. A method of assembling a fuel injection system for use with a combustor of a turbine assembly, said method comprising:

positioning a fuel manifold at least partially within a fuel injection housing, the fuel injection housing having an inner wall and an outer wall and at least partially defining an annular cavity radially outward and surrounding said wall;

forming a plurality of fuel injection ports in the fuel manifold such that the fuel injection ports extend through the fuel injection housing, each fuel injection port of the plurality of fuel injection ports configured to introduce a fuel stream into the annular cavity;

positioning an air manifold at least partially radially inward about said inner wall of the fuel injection housing;

forming a first plurality of air injection ports in the air manifold such that the first plurality of air injection ports extend through the fuel injection housing from said inner wall to said outer wall downstream of the plurality of fuel injection ports; and forming a second plurality of air injection ports in the air manifold such that the second plurality of air injection ports extend through the fuel injection housing from said inner wall to said outer wall downstream of the first plurality of air injection ports, each air injection port of the first plurality of air injection ports and the second plurality of air injection ports is configured to introduce an air cushion into the annular cavity to facilitate film cooling of the fuel injection housings, wherein forming the first plurality of air injection ports comprises forming a plurality of sets of ports in fluid communication therein, wherein each of said set of plurality of ports is associated with a corresponding fuel injecton port of said plurality of fuel injection ports, wherein each port of said set of plurality of ports is equally spaced around said outer wall forming a substantially arcual shape having an arc center at a center point of said corresponding fuel injection port, and wherein the fuel injection system is positioned on an annular dome mounted upstream from a combustion chamber of the combustor.

16. The method in accordance with claim 15, wherein forming the second plurality of air injection ports comprises forming at least one row of equally circumferentiaily-spaced second air injection ports about said outer wall of the fuel injection housing.

17. The method in accordance with claim 15, wherein forming the second plurality of air injection ports comprises forming each of the second plurality of air injection ports to extend through said outer wall of the fuel injection housing at an angle of approximately 20.0 degrees with respect to a longitudinal axis of the turbine assembly.

* * * * *